United States Patent [19]
Scheps

[11] Patent Number: 5,307,358
[45] Date of Patent: Apr. 26, 1994

[54] WAVELENGTH DISPERSIVE GAIN ELEMENT FOR A TUNABLE LASER

[75] Inventor: Richard Scheps, Del Mar, Calif.

[73] Assignee: The United States of America as represented by the Secretary of the Navy, Washington, D.C.

[21] Appl. No.: 67,504

[22] Filed: May 20, 1993

[51] Int. Cl.⁵ .............................................. H01S 3/10
[52] U.S. Cl. ...................................... 372/20; 372/70; 372/71; 372/108; 372/92; 372/100; 372/98; 372/53
[58] Field of Search ................... 372/20, 71, 70, 108, 372/92, 100, 98, 53

[56] References Cited

U.S. PATENT DOCUMENTS

| | | | |
|---|---|---|---|
| 3,810,040 | 5/1974 | Martin et al. | 356/246 |
| 4,517,675 | 5/1985 | Mourou et al. | 372/53 |
| 4,836,953 | 6/1989 | Kokta | 252/301.4 F |
| 4,873,692 | 10/1989 | Johnson et al. | 372/20 |
| 4,897,843 | 1/1990 | Scott | 372/20 |
| 4,912,713 | 3/1990 | Langhans | 372/66 |
| 5,020,073 | 5/1991 | Alfrey et al. | 372/105 |
| 5,056,103 | 10/1991 | Alfrey et al. | 372/20 |
| 5,173,908 | 12/1992 | Negus et al. | 372/20 |

OTHER PUBLICATIONS

Irving H. Malitson, "Refraction and Dispersion of Synthetic Sapphire", *Journal of the Optical Society of America*, vol. 52, No. 12, Dec. 1962, pp. 1377-1379.

J. Duclaux and P. Jeantet, "Methodes De Spectrographie Pour L'Ultra-Violet", *Revue D'Optique Theorique Et Instrumentale*, pp. 384-391, 1923.

*Primary Examiner*—Georgia Y. Epps
*Attorney, Agent, or Firm*—Harvey Fendelman; Thomas G. Keough

[57] ABSTRACT

A tunable laser is described in which the gain element is fabricated to produce wavelength dispersion within the laser resonator cavity. Specifically, the laser gain element has Brewster angled entrance and exit faces which allow it to operate as a wavelength dispersive element while simultaneously performing the functions of an optical gain element within a laser cavity. Wavelength tuning is effected by angular rotation of one of the end reflective elements in the cavity. By using suitable dispersive materials for the laser gain element no additional tuning elements are required providing high efficiency, low threshold laser operation for a variety of optical excitation methods. The laser gain element replaces other discrete intracavity laser tuning means required for tunable lasers, including prisms, diffraction gratings, and birefringent filter elements. Solid state crystalline laser gain elements which are doped with impurity ions for laser operation are highly suitable for this type of laser, as are ion doped glasses or other amorphous materials. In addition, a suitable laser gain element can be constructed of a hollow fluid-containing cell where the cell is fabricated in the shape of a Brewster dispersing prism and the cell is filled with a laser gain fluid such as a dye solution or a chelate solution. Optical exciting means and geometries are discussed, as are the conditions for minimizing astigmatism introduced by the prism.

24 Claims, 4 Drawing Sheets

WAVELENGTH DISPERSIVE GAIN ELEMENT FOR A TUNABLE LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to lasers and particularly to tunable lasers which produce laser emission at one or more wavelengths over a preselected wavelength range. Tunable lasers are lasers which have the capability of emitting one or more wavelengths over a broad range of wavelengths. These lasers are continuously tunable over a preselected range of wavelengths and differ from non-tunable lasers which emit at certain fixed, discrete wavelengths. As a consequence of their continuous tunability, tunable lasers have proven to be extremely useful in a wide variety of applications. Two vital characteristics that determine the utility of a specific tunable laser for a given application are the wavelength range over which the laser is tunable and the bandwidth of the emitted line. The broadest wavelength range for laser operation is determined by the gain bandwidth of the gain medium itself. Generally speaking, the wavelength range over which a tunable laser can operate is limited for a particular resonator configuration to the wavelength range for which the optical gain exceeds the sum of all of the losses, including passive loss, excited state absorption and output coupling loss. For a given laser resonator configuration the tuning range will therefore be affected by the pump intensity, by the wavelength range of the coatings on all of the intracavity optical elements including reflective and anti-reflective coatings, and the absorption of the various optical elements contained within the laser resonator cavity through which the resonator light must pass. The bandwidth of a given line, on the other hand, is controlled by the insertion of various dispersive or linewidth narrowing elements placed within the laser resonator. Dispersive elements would include prisms or diffraction gratings while non-dispersive means of reducing the linewidth would include intracavity etalon plates or birefringent wave plates. If the loss exceeds the gain for any given wavelength the laser cannot operate. Therefore, in determining the types of intracavity elements which may be used one must not insert elements into the cavity whose losses would be high enough to prohibit lasing of the gain material for a given pump power density at the desired wavelength.

Generally speaking, lasers, and specifically tunable lasers, can be excited by either cw (continuous wave) means, or by pulsed means. For pulsed excitation the initial population inversion created by the pumping source is substantially higher than the steady state or cw population inversion. Therefore, the gains that can be realized by pulsed excitation are often much higher than those that can be achieved in cw or steady state excitation. As a consequence, elements with relatively high loss can be inserted into the cavity when using pulsed excitation without eliminating the laser operation of the cavity. However, for cw operation, the population inversion is clamped near threshold and elements inserted into the cavity must have low insertion loss compared to the output coupling. A basic tunable laser consists of several components, including a gain or active medium, two or more reflective surfaces to form a resonator therebetween and a means for tuning or adjusting the wavelength of the laser emission. If no tuning element is inserted into the cavity the laser is described as "free-running" or "untuned" and it will operate at a wavelength close to the wavelength for which the net gain is highest. The net gain is defined as the gain minus the sum of all losses.

In selecting tuning elements for a cw or steady state laser a selection is made among tuning elements with low insertion losses. As mentioned before, suitable tuning elements for cw lasers include prisms and birefringent filters, or etalons can be used to tune over narrow wavelength ranges in a cw laser. Because prisms are dispersive and birefringent filters are not, there are applications for which a prism is a more appropriate tuning element than a birefringent filter. One such application involves multifrequency operation of a tunable laser, as is described in co-pending U.S. patent application Ser. No. 07/970,328 U.S. Pat. No. 5,276,695 entitled "A Multifrequency Rapidly Sequenced or Simultaneously Tunable Laser" by Richard Scheps.

There are several sources of optical loss caused by an intracavity prism. One source is due to reflections at the entrance and exit faces of the prism. In addition, diffraction losses occur when the prism aperture is small compared to the beam diameter. Finally, losses occur when the beam undergoes scattering and absorption as it is transmitted through the prism material. The material from which the prism is manufactured should have high dispersion to provide relatively fine wavelength adjustment. The degree of dispersion of a prism material is characterized by the Abbe constant of the material. Thus, the criteria for selecting a prism or prisms to insert into a tunable laser cavity are that the insertion loss due to reflection, diffraction, scattering and absorption by the prism material be kept to a minimum and that the dispersion of the prism be as high as possible.

The highest Abbe constants are generally associated with optical materials that have high Verdet coefficients such as those used in Faraday rotator glasses. Unfortunately these materials generally tend to have high scattering losses and absorb strongly at wavelengths between 800 nm and 1 micron. It is difficult to find a prism material with high dispersion and low insertion loss and design a suitable prism for use in a tunable laser operating at wavelengths from 700 nm to 1 micron. Furthermore, the use of a discrete tuning element in the cavity adds to the resonator passive losses and reduces the net gain.

Thus in accordance with this inventive concept a need has been recognized for an operational tunable laser which can be tuned without requiring a separate, discrete tuning element inside the laser cavity to provide the advantages of a low threshold and high operating efficiency tuning of the laser output wavelength.

SUMMARY OF THE INVENTION

The present invention is directed to providing a tunable laser and more specifically a tunable laser that can be tuned without requiring a discrete, separate tuning element. Instead, the laser is tuned by a combination of adjustments to the gain element and feedback mirror. A laser resonator is made up of one or more end flat reflective elements, two curved fold mirrors and an output coupler reflective element to form a reflective path therebetween and define a laser resonator cavity. A laser gain element is disposed in the reflective path in the laser resonator cavity, and a means for optically exciting the laser gain element is appropriately disposed to pump the laser gain element to produce a laser emission over a preselected range of wavelengths. A means for wavelength tuning such as a dispersing prism must be disposed in the reflective path in the laser resonator cavity for the purpose of tuning the laser emission to a desired wavelength in the preselected range of wavelengths. When the laser gain element is properly fabricated and made of suitably dispersive optical material or materials, this gain element can then also serve as the wavelength tuning means.

Because the path of the pumping beam from the optical exciting means through the gain element determines the gain path in the laser gain element, tuning of the laser generally is most efficient when the laser gain element, which is also the wavelength dispersing element, remains fixed in its orientation with respect to the pumping beam. In this inventive concept, tuning is effected in general by rotating one of the end reflective elements. The two curved fold mirrors concentrate the laser resonator cavity mode energy within the laser gain element. The curved mirrors also serve to collimate the laser resonator cavity mode in the region of the laser resonator cavity between the curved mirror and an adjacent flat reflector. The laser resonator cavity mode is not collimated as it passes through the laser gain element in order to optimize the power density provided by the optical exciting means. As a consequence, the wavelength dispersion will be degraded somewhat. However, using an appropriately configured resonator, the Rayleigh range of the focused resonator mode can be made long compared to the optical path length within the laser gain element and thereby provide a highly concentrated, almost collimated path in the laser gain element to produce effective wavelength dispersion.

As configured, the laser contains a collimated and a focused region. The collimated region can further include elements for line narrowed operation at one or more wavelengths and shutters or apertures or the like. By end pumping the laser gain element a gain aperture is created which allows the laser to operate only at the lowest order spatial transverse mode at the desired wavelengths in the preselected range of wavelengths. The end faces of the laser gain element are cut at Brewster's angle to provide the minimum insertion loss due to reflection. Light polarized perpendicularly to the plane of incidence will have a higher reflection loss at the Brewster face than light polarized parallel to the plane of incidence. Therefore, the Brewster faces introduce low reflection loss for light polarized parallel to the plane of incidence and introduce approximately four percent loss (per pass) due to reflection for light polarized perpendicular to this plane. Thus there is a high selectivity for light polarized parallel to the plane of incidence.

A laser gain element has two polished faces through which the resonator mode passes. These faces are known as "end faces" and serve as entrance and exit faces for laser mode radiation. Typically, Brewster end faces on laser gain elements are oriented parallel to one another to minimize the deviation due to wavelength dispersion by the gain element and also to provide only a minimum offset to the optical path of the laser resonator mode as it propagates through the laser gain element. However, in accordance with this inventive concept which has the gain element also serving as a wavelength dispersing element, the two Brewster faces are cut to lie in mutually intersecting planes. That is, the laser gain element is formed in the shape of a section of a prism. The gain element can be cylindrical in cross section. In this case the gain element is shaped as if it were fabricated from a prism by boring out a rod-shaped gain element with for example a hollow-cylinder boring tool oriented parallel to the base of the prism. The resonator mode then enters one side of the gain element at a first angled Brewster face, propagates parallel to the longest dimension of the rod-shaped gain element and then exits through the second angled Brewster face which is appropriately angled to lie in a plane that intersects the plane containing the first Brewster angled face. In each case the angles of refraction are determined by Snell's law and are wavelength dependent based on the dispersion of the laser gain medium. Thus, different wavelengths will enter and exit the laser gain element at different angles and feedback can be provided for a specific wavelength simply by adjusting the angular orientation of one of the end reflective elements.

OBJECTS OF THE INVENTION

Accordingly, an object of the invention is to provide a tunable laser that combines the features of wavelength tuning and optical amplification into a single intracavity gain element and can be tuned by rotating one of the reflective elements of the cavity without adjusting the angle of the gain element.

Another object of the invention is to provide a laser gain element for a tunable laser in such a shape that is can also be used to provide wavelength tuning.

Yet another object of the invention is to provide a high efficiency, low loss tunable laser which can operate cw and be tuned to the appropriate wavelength by angular adjustments of the gain element.

Another object of the invention is to provide a tunable laser with a gain element which also provides wavelength dispersion and as a consequence can be used to tune the laser output wavelength.

Another object of the invention is to provide a tunable laser with a gain element which can be used to allow simultaneous multifrequency operation without the use of an additional prism or other wavelength dispersive means or tuning means.

Another object of the invention is to provide a tunable laser having the capability of operating at two or more wavelengths simultaneously in which each wavelength can be tuned independently of the other.

Another object of the invention is to provide a tunable laser which is capable of operating at two or more wavelengths simultaneously and in which the laser cavity contains a dispersive gain element placed in a minimum deviation configuration.

Another object of the invention is to provide a tunable laser with a cell suitable for containing a liquid or gaseous fluid gain medium which additionally provides wavelength dispersion and can be used to tune the emitted wavelength of the laser.

These and other objects of the invention will become more readily apparent from the ensuing specification and drawings when taken in conjunction with the appended claims.

BRIEF DESCRIPTION OF THE DRAWINGS

FIG. 4b shows an isometric view of a truncated prism-shaped gain element of FIG. 4a.

DETAILED DESCRIPTION OF THE PREFERRED EMBODIMENTS

This inventive concept involves the realization and implementation of a laser gain element to serve the dual function of providing both optical gain in a laser resonator as well as wavelength dispersion. A tunable laser which has no discrete or separate tuning element, but incorporates the tuning function into one or more existing elements, such as the gain element or end mirror, will therefore have lower passive losses than a laser which requires an additional element for tuning. Such a laser is far simpler to construct and has the additional advantages of a low threshold and high operating efficiency.

The design of the optical laser gain element disclosed herein is generic and could be used either in laser systems with several fixed wavelength transitions such as Nd:YAG where the 1.064μ transition operates simultaneously with laser lines at 1.32, 1.34, 1.36, 1.42, 1.44 and 0.942μ or in continuously tunable laser systems such as Ti:sapphire, as mentioned above, which tunes between approximately 650 nm and 1.1μ. Other exemplary laser systems are: Cr:LiCAF which can be tuned between about 720 nm and 850 nm; alexandrite ($Cr^{3+}$-doped $BeAl_2O_4$) which tunes between approximately 760 nm and 1μ; Cr:LiSGAF which can be tuned between approximately 800 and 900 nm; Tm:YAG which can be tuned between about 1.87μ and 2.6μ; Tm:YSGG which can be tuned between about 1.85μ and 2.14μ; Tm:GSGG which can be tuned between about 1.92μ and 2.04μ; Ho:YAG which can be tuned between about 2.05μ and 2.51μ and between about 2.84μ and 2.92μ; and Er:YAG which can be tuned between about 2.7μ and 2.96μ.

The optical laser resonator gain element can be resonantly pumped or flash pumped. The wavelength range over which the laser system operates is determined by the dopant or dopants used in the laser gain element as well as by the reflective coatings and transmission of the optical elements making up the resonator that defines the laser resonator cavity. As discussed above, some of the exemplary dopants that can be used in laser gain elements are $Er^{3+}$, $Ho^{3+}$, $Nd^{3+}$, $Cr^{3+}$, $Ti^{3+}$ and $Tm^{3+}$. In addition, other activator ions which can be used are various ones of divalent ($Mn^{2+}$, $Co^{2+}$ and $Ni^{2+}$) and quadrivalent ($Cr^{4+}$ and $V^{4+}$) transition metal ions; trivalent actinides ($U^{3+}$); and divalent rare earth ions ($Sm^{2+}$, $Tm^{2+}$ and $Eu^{2+}$).

Figure 1:
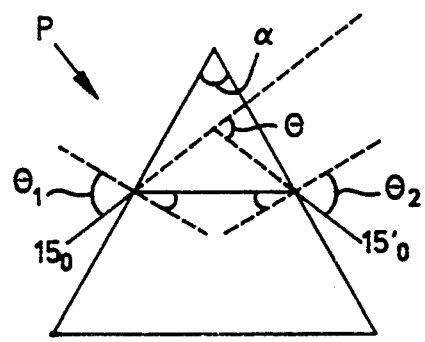
FIG. 1 illustrates the path of a ray through a prism.

A prism may be used in an optical system to deflect or deviate a beam of light. The prism can invert or rotate an image, disperse light into its component wavelengths, and may be used to isolate separate states of polarization. Prisms are essentially blocks of optical material with flat polished sides that are oriented at precisely controlled angles with respect to one another. The geometrical angles of the polished prism faces with respect to each other are of prime importance. The emphasis of the present inventive concept involves the advantageous use of the ability of prisms to disperse. Dispersion refers to the change of the refractive index of a material as function of wavelength. Several types of dispersing prisms are known, including equilateral prisms such as shown in FIG. 1, Littrow prisms and Brewster prisms.

In designing a prism for use within a laser resonator cavity one primary concern is that the prism introduce a minimum amount of loss. Losses occur generally by absorption and scattering within the laser prism material and by reflections of the resonator mode at the prism surfaces. To a great extent scattering within the prism can be controlled by proper fabrication techniques, including initial growth of the bulk prism material from the melt and subsequent annealing. Scattering may be caused by dislocations (for crystalline material), and by microscopic bubbles, stria, and index inhomogeneities, as well as other well-known and well-documented material defects. Absorption is generally a basic property of the prism material, although in some cases absorption may be due to impurities that have found their way into the material. Corrective growth techniques or subsequent refining techniques can in some cases remove these impurities and reduce or eliminate absorption due to impurities.

The losses associated with reflections at the surface of the prism can be reduced by suitable anti-reflective (AR) coatings placed on the prism entrance and exit surfaces. However, for tunable lasers, broadband AR coatings have reflectivities typically of 0.5 percent per surface, which would mean for two surfaces and round-trip total loss due to reflection could be as high as 2 percent.

This percentage of losses can be unacceptable for many applications and, in general, the most suitable type of prism for intracavity laser use when loss is a concern is the Brewster prism. This is due to the low reflectivity of uncoated Brewster surfaces for light polarized parallel to the plane of incidence. Thus, these types of prisms can be used inside laser cavities operating on very low gain laser transitions where even slight reflective losses reduce the laser efficiency. More importantly, because the refractive index does not change rapidly as a function of wavelength, Brewster angle prisms may be used over a relatively large wavelength range without regard to reflective losses over this relatively large wavelength range.

The most appropriate orientation of a prism within a laser cavity is that known as the minimum deviation orientation. Since, in general, prisms introduce astigmatism to the laser resonator beam, this astigmatism is minimized when the rays pass through the prism symmetrically, that is, with equal refraction at each surface. Minimizing the astigmatism introduced by a prism in a resonator mode is important for maximizing the laser efficiency both in terms of reducing the laser threshold and increasing the laser slope efficiency.

Referring to the drawings wherein like reference numerals designate identical or corresponding parts throughout the several views, FIG. 1 illustrates the path of a ray through prism P entering at $15_o$ and leaving at $15'_o$. The deviation angle $\theta$ is the angle between the initial path of the ray prior to entering the prism at $15_o$ and the final path of the ray exiting the prism at $15'_o$. When the ray traverses the prism symmetrically so that $\theta_1 = \theta_2$, the deviation $\theta$ is less than for any other angle of incidence $\theta_1$. In such a case the prism is said to be set at minimum deviation. The change in deviation angle $\theta$ for a prism P having a refractive index n and set at minimum deviation is given by:

$$\frac{d\theta}{dn} = \frac{2 \sin(\alpha/2)}{\sqrt{1 - n^2 \sin^2(\alpha/2)}} \quad (1)$$

where $\alpha$ is a prism apex angle of prism P. A more complete description of the basic dispersion relationships for a prism is given by Sawyer (see R. A. Sawyer, *Experimental Spectroscopy*, Dover, N.Y., 1963, pp. 58-62.) The true angular dispersion of the prism is $$\frac{d\theta}{d\lambda}$$

and this can be obtained from the relation $$\frac{d\theta}{d\lambda} = \frac{d\theta}{dn} \cdot \frac{dn}{d\lambda} \quad (2)$$

$$\frac{dn}{d\lambda}$$

is a basic function of the dispersing material and for many materials the variation of the refractive index with the optical wavelength is well known and is tabulated. In addition, the data for the variation of the refractive index with wavelength can be fit to an analytical function $n(\lambda)$ so that equation (2) can be determined analytically over a range of wavelengths. As an exemplary case the refractive index of sapphire crystalline material ($Al_2O_3$) over a large wavelength range has been measured by Mallitson, (see I. H. Mallitson, "Refraction and Dispersion of Synthetic Sapphire," *Journal of the Optical Society of America*, vol. 52, 1967, p. 1377). Several values of the observed refractive index between the wavelengths 500 nm and 1.01μ are given in Table 1. This data was fit by mallitson to a dispersion equation:

$$n^2 - 1 = \frac{A_1\lambda^2}{\lambda^2 - \lambda_1^2} + \frac{A_2\lambda^2}{\lambda^2 - \lambda_2^2} + \frac{A_3\lambda^2}{\lambda^2 - \lambda_3^2} \quad (3)$$

where at 24° C., $\lambda_1^2 = 0.00377588$, $\lambda_2^2 = 0.0122544$, $\lambda_3^2 = 321.3616$, $A_1 = 1.023798$, $A_2 = 1.058264$, $A_3 = 5.280792$ over the wavelength range covered by Table 1. For a more complete description of equation (3), see W. W. Wolfe, "Properties of optical materials" in *Handbook of Optics*, Mcgraw-Hill, New York, 1978, p. 7-101.

TABLE 1

| λ, nm | n |
|---|---|
| 546.071 | 1.77078 |
| 576.960 | 1.76884 |
| 579.066 | 1.76871 |
| 643.85 | 1.76547 |
| 706.519 | 1.76303 |
| 852.12 | 1.75885 |
| 894.40 | 1.75796 |
| 1013.98 | 1.75547 |

The typical deviation between the observed and calculated refractive index using equation (3) is less than one part in $10^5$, or 10 ppm. Using the dispersion equation (3), the derivative of the refractive index with respect to $\lambda$, $dn/d\lambda$, can be determined analytically and is used in equation (2) to derive an accurate expression for the angular dispersion.

Numerous crystalline and amorphous materials have been found to be suitable for prisms for intracavity use in a laser. However, the quality of commercially available material is important. Material quality is determined by the growth of the material as well as its inherent properties over the wavelength range for which one intends to use the material. In addition, other issues such as whether the material is hygroscopic or is easily damaged by high optical fluence will be factors to determine whether it can be used in a laser. The ideal prism material should be transparent over the preselected range of wavelengths. It should isotropic, available in large homogeneous pieces capable of taking an excellent optical polish, resistant to atmospheric exposure and fumes in the laboratory, and have a relatively large characteristics dispersion. Both $$\frac{dn}{d\lambda}$$

should be large and the temperature (T) coefficient of the index of refraction (dn/dT should be small.

Optical media completely satisfying all of these requirements over all desired wavelength ranges are not available, and some compromises must be accepted. In the visible region the possibilities for an acceptable prism material are best. They include a wide variety of optical glass which is generally preferred for use in the visible region because it is relatively inexpensive.

It should be pointed out that prism materials are not restricted solely to solid state materials. Liquid prisms have been used to some extent in the visible region and also in the ultraviolet. Since both dye lasers and chelate lasers utilize liquid gain media, this realization extends the utility of this inventive concept to liquids enclosed in a hollow prism as well as solid state laser gain elements. The liquid prism has an advantage of uniformity and homogeneity, and can be constructed using a wide range of materials and dispersions. A disadvantage of liquids is their uniformly high temperature coefficient of dispersion, which is usually of the order of from 10 to 100 times that of glass. Temperature gradients in the liquid give rise to inhomogeneities in dispersion and to convection currents, and lead to changes in dispersion and to loss of resolution. Accordingly, much closer temperature control is require than for solid state media. In spite of this difficulty, the large dispersion obtainable with liquids, together with their other advantages, justify the use of liquid prisms as intracavity laser dispersive gain elements.

In general, gain elements are doped materials. By this it is meant that there is a host material in the case of a solid state laser which can be either a glass or amorphous material or a crystalline material. This material is doped to a certain extent, anywhere from, generally, 0.01 percent up to 100 percent doping, with an impurity ion such as $Cr^{3+}$ or $Nd^{3+}$. For the case of liquids, generally, there is a low concentration solute which acts similar to a dopant, dissolved in a solvent. For dye lasers the concentrations of dye that are useful are on the order of $10^{-5}$ to $10^{-3}$ Molar. These are relatively dilute solutions.

In most cases the presence of low density impurity or solute constituents in the gain medium does not affect the dispersion of the gain medium. Dispersion is determined primarily by the host solid state material or the solvent. Only in the region where there is absorption due to the impurity does the refractive index change dramatically relative to the index of the pure host or solvent. The phenomenon of the change of refractive index as a function of wavelength in the region of an absorption line is known as anomalous dispersion. However, it can be readily noticed that over the wavelength range where the gain material absorbs, the gain material is not capable of lasing with any great efficiency, if at all. Therefore, for most applications the dispersion of the gain element is determined by the dispersion of the pure host.

The dispersion of the gain element being determined by the dispersion of the pure host will not be true, however, for very highly doped materials such as stoichiometric materials or highly doped interstitial materials. However, this is not to say that in those cases where the refractive index of the doped material is substantially different than the refractive index of pure or un-doped material, that these materials cannot be effective dispersing materials. The utility of the gain material as a wavelength dispersive medium can be determined from the dispersion of the materials; that is, the change of refractive index with wavelength, $dn/d\lambda$.

Several common solvents for chelates and dyes such as water, for example, have been found to have useful dispersion. Water, in particular, although having a low dispersion, has been used to considerable extent in liquid prisms. The low temperature coefficient of the index of refraction for water makes it less troublesome to use than other liquids and its great transparency in the ultraviolet gives it importance in regions near 200 nm. Thus, for example, Duclaux and Jeantet, (see J. Duclaux and P. Jeantet, *Revue d'Optique*, Vol. 2, p. 384, 1923) have pointed out not only that water is highly transparent in the region 210 nm to 180 nm, but also that the mean dispersion of water in the region 199 nm to 186.2 nm is almost 20 percent greater than that of quartz. Furthermore, the smaller index of refraction of water permits larger prism angles for equal reflection losses with consequent gain in angular dispersion. Therefore, water cannot be disregarded as a dispersing medium in this region.

Two criteria are generally used to characterize the wavelength dispersion of a material used for a prism in accordance with this inventive concept. The Abbe constant $V_d$ is given by:

$$v_d = \frac{n_d - 1}{n_f - n_c} \quad (4)$$

where $n_f$ and $n_c$ are the refractive indices at the wavelengths 486.13 nm and 656.27 nm, respectively, and $n_d$ is the refractive index at 587.56 nm. For example, for sapphire $n_d$, $n_f$ and $n_c$ are approximately 1.7682, 1.7756 and 1.7649, respectively, giving a value of $V_d$ of 71.51. The Abbe constant is a particularly suitable expression of the way in which the refractive index changes with wavelength. The difference $n_f - n_c$ is called the principal dispersion, and it is another way in which the optical dispersion of a material is commonly expressed. The higher the principal dispersion the greater will be the angular dispersion for a given material in a specific orientation. Typical ranges of the principal dispersion are from several times $10^{-3}$ to several times $10^{-2}$. Water, for example, has a principal dispersion of $6 \times 10^{-3}$ while other typical values are $6.7 \times 10^{-3}$ for fused quartz, $2.9 \times 10^{-2}$ for potassium iodide, and $1.9 \times 10^{-2}$ for dense flint glass. The principal dispersion for sapphire is approximately $1.1 \times 10^{-2}$, which makes it highly suitable as a dispersive element.

Other concerns associated with inserting a prism inside a laser cavity in accordance with this inventive concept are related to optical damage, optical quality of the surfaces, the extent to which high quality polishes can be performed on the prism surfaces, optically-induced damage, thermal loading, and the like. Because in accordance with this inventive concept the same material is used for the prism as is used for the gain element, and since the concerns associated with a prism are identical to those associated with concerns regarding the gain element, these additional criteria are basically not an issue. That is to say, gain elements must be free of optical inclusions, resistant to thermal lensing, must have good optical polish capabilities and good homogeneity, low stria and low deslocations in order to operate effectively as a laser material. Although the gain element has a second function in the cavity, which is to be a dispersive element, this additional function does not detract from its ability to achieve the appropriate specifications as a laser material and, in fact, guarantee that it will not create any problems due to thermal, optical or other types of damage that are associated with other prism materials that may be inserted inside the cavity.

Another factor taken into consideration in this inventive concept is a tunable laser capability. Tunable lasers are lasers which are capable of emission over a relatively broad range of wavelengths. Tunable lasers are continuously tunable over this range of wavelengths, which means that, in principal, any specific wavelength can be selected in this wavelength operating range. For tunable lasers, the bandwidth of the laser emission can be controlled by insertion of narrowing elements such as intracavity etalons, for example. Therefore, tunable lasers are extremely useful devices in that they can emit over a wide wavelength range with exceptionally narrow bandwidths. A vital element in making the tunable laser a useful device is a means inside the cavity for selecting the output wavelength. Such a device, which is referred to as a tuning means, will also have an effect on the bandwidth of the line.

Numerous types of tuning means are available and are well known in the art. Some of these have been previously mentioned with their advantages and disadvantages noted. For cw operation the insertion loss due to the tuning means within the laser cavity should be as low as possible. Birefringent tuners, which are multiple plates of birefringent material, are commonly used for this purpose. However, this type of tuner does not provide dispersion. Therefore, different wavelengths do not have different trajectories or paths within the resonator. Birefringent filters operate by providing different degrees of loss for different wavelengths so that only wavelengths which experience the minimum amount of loss for a given orientation of the birefringent filter will be allowed to oscillate and consequently dominate the laser dynamics of the gain medium.

When dispersion is desired or required, an intracavity prism or prisms are the best choice for cw laser operation. However, as noted above, any elements inserted within the laser cavity will introduce additional loss. If the element is one which must transmit the laser resonator mode radiation, losses can occur due to reflections at both the entrance and exit faces of the optical element as well as due to absorption and scattering and other processes which occur as the resonator mode is transmitted through the medium. Therefore, in order to maximize laser efficiency and laser power and to minimize the laser threshold, it is important to introduce as few loss-producing elements into the laser cavity as possible and to have elements which are introduced be of the highest optical quality and resistant to optical damage.

As the laser tuning means for a tunable laser is an essential element in a tunable laser, a significant improvement in the operation of a tunable laser is achieved when the tuning element is also the gain element. In this inventive concept a gain element is disclosed which not only serves as the optical amplification medium in the tunable laser, but also provides wavelength dispersion and serves as the tuning means when used in conjunction with a flat highly reflective (HR) laser cavity mirror. Therefore, no additional elements need be inserted inside the cavity for tuning of the laser. The desired optical properties of the gain element including surface quality, medium homogeneity, and resistance to optical damage are not affected by its additional use as a tuning element.

Figure 2:
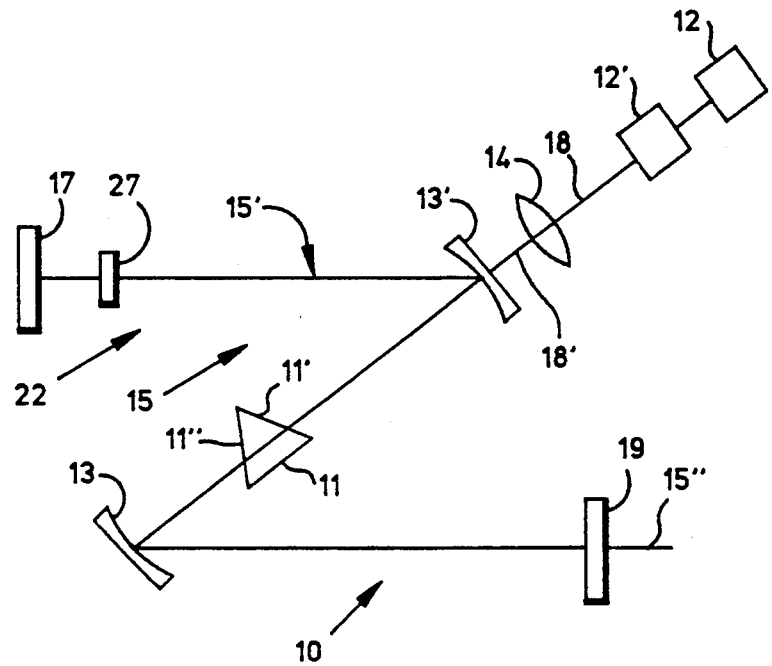
FIG. 2 illustrates a first embodiment of a tunable laser using a wavelength dispersive gain element in accordance with this inventive concept.

Referring to FIG. 2, a first embodiment of a tunable laser in which the gain element is used as a tuning element is illustrated. A tunable laser 10 of FIG. 2 has its laser gain element 11 pumped by an argon ion laser 12. The laser gain element is an exemplary $Ti^{3+}$-activated sapphire host crystal to produce a laser beam or emission which can be tuned within the wavelength range of about 700 nm to 850 nm.

The tunable laser 10 includes a laser gain element 11 disposed in a resonator 15 defined by optically aligned end reflective element or mirror 17, concave fold reflective elements 13 and 13' and an output coupler reflective mirror 19. Mirror 17 is highly reflective while mirror 19 is partially transmissive to a laser wavelength of approximately 700 nm to 850 nm to provide the output coupling for the laser emission within the wavelength range of about 700 nm to 850 nm from tunable laser 10. It should, however, be noted that a different wavelength can be realized by utilizing different reflective coatings on optical elements 17, 13, 13' and 19, or by utilizing a laser gain element 11 which contains one or more different dopants and different associated optical elements. In addition, other gain media such as amorphous or glass-like materials, or liquid and gaseous materials, may be used as the laser gain element in this inventive concept. In the context of this patent, the term "adjacent" refers to an optical element in the laser cavity which receives laser mode radiation directly from another given element in the cavity. That is, elements A and B are adjacent if the resonator mode radiation passes to element B directly from element A. For example, highly reflective mirror 17 is adjacent to fold mirror 13', while output coupler 19 is adjacent to fold mirror 13.

Argon ion laser 12 produces a pumping mode output. The pump laser output polarization, rotated by polarization rotation optics 12', produces a collimated beam 18 that is focused into a focused pumping beam 18' by an exemplary 25 cm focal length lens 14 onto Ti:sapphire crystal 11. The pumping of laser gain element 11 is end pumping to improve the energy conversion efficiency, particularly when the pumping mode is oriented and focused for mode overlap with the resonator mode as disclosed herein. End pumping of laser gain element 11 relies upon pump laser 12, polarization rotation apparatus 12' and lens 14. In addition, a concave fold mirror 13' should not be plano-concave as is typically used for concave laser mirrors. Instead, mirror 13' should be concave-convex where the absolute value of the radii of curvature of both mirror surfaces are the same. This is commonly referred to as a "meniscus" substrate. This type of mirror substrate is desirable for high efficiency end pumping since in conjunction with the proper selection of the focal length and position of focusing lens 14 relative to mirror 13' it will provide virtually no distortion to the focused end pumping beam 18' as the beam passes through the concave fold mirror 13'. This will be true only when the radius of curvature of the focused pump beam matches the absolute value of the radii of curvature at both surfaces of the meniscus mirror 13'.

Figure 3:
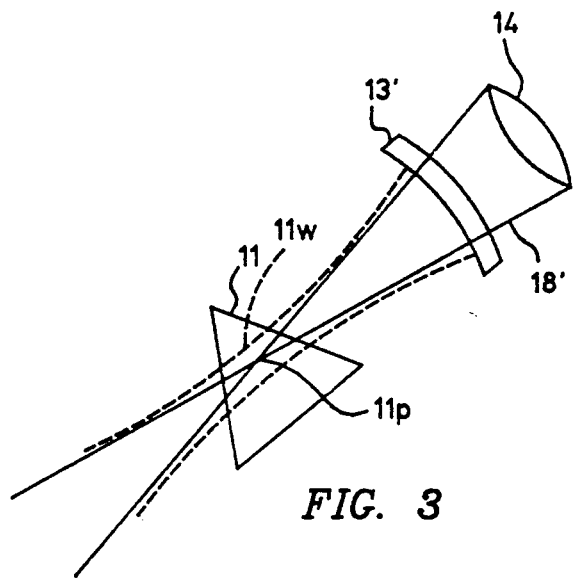
FIG. 3 shows details of the end pumped dispersive gain element of FIG. 2.

Referring to FIG. 3, laser resonator cavity mode waist 11w is adjusted to be located approximately in the center of Ti:sapphire laser crystal 11. Focused pump mode laser beam 18' is adjusted so that the focused pump mode waist 11p is approximately co-located with the laser resonator cavity mode waist 11w at about the center of the laser gain element. The diameter of the pump mode waist 11p and laser resonator cavity waist 11w can be made approximately equal by proper selection of the focal length of lens 14 and the spacing between concave fold mirrors 13 and 13'. Matching the two waists 11w and 11p in size and position, in general, leads to the best pump and output efficiency for tunable laser 10. Note that for the sake of clarity, in FIG. 10 the size of the pump waist relative to the resonator waist is shown to be substantially smaller than its actual size.

Laser gain element 11 in FIG. 2 is shown in the shape of a Brewster angle dispersive prism. Although refraction of the resonator mode 15' at the prism faces 11' and 11'' is not accurately depicted to maintain clarity, resonator mode 15' is incident at prism faces 11' and 11'' at Brewster's angle. The depiction of the beams as shown in FIG. 2 is to avoid unnecessary complications only and for ease of understanding the inventive concept disclosed herein.

Figure 4A:
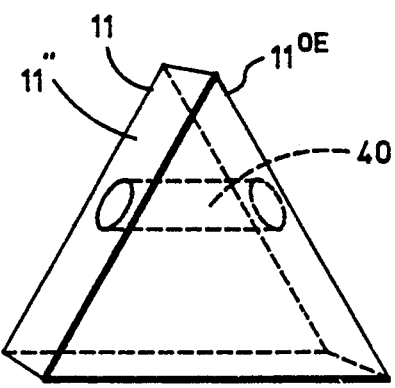
FIG. 4a shows an isometric view of the prism-shaped gain element.
Figure 4B:
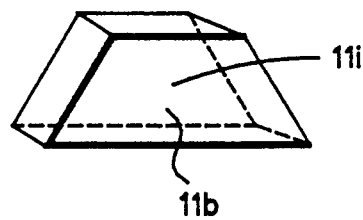
Figure 4C:
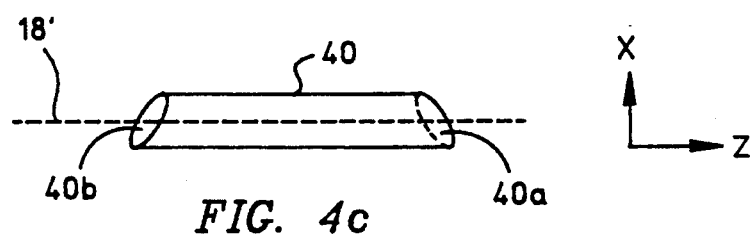
FIG. 4c shows a rod-shaped gain element fashioned from the prism of FIG. 4a having wavelength dispersive properties.

However, because of the expense and difficulty involved in the fabrication of laser gain element 11 in the shape of a prism, and, due additionally to the fact that the entire bulk of the prism is not necessary for this inventive concept to operate properly, the shape of the gain element may be changed without affecting its utility for tuning the laser output wavelength. FIGS. 4a, 4b and 4c illustrate several variations of the shape for the dispersive Brewster angle prism geometry of laser gain element 11 which operate identically to the dispersive Brewster angle prism referred to in FIGS. 1, 2 and 3 above. In FIG. 4a the entire Brewster angle prism 11 is shown and in FIG. 4b the apex of this prism is truncated, leaving a trapezoidal-shaped geometry gain element. The laser gain element configuration shown in FIG. 4b uses less gain material than the gain element shown in FIG. 4a and therefore would be less expensive to fabricate. In addition, by polishing a prism face 11b, for example, this type of gain element can be side pumped. That is, in place of using pumping beam 18' from argon ion laser 12 to end pump the laser gain medium, optical excitation of laser gain element 11 can be accomplished by pumping across laser gain element face 11b illustrated in FIG. 4b. When the interior 11i of the trapezoidal gain element is hollowed out and filled with a fluid gain medium, this structure can serve as a fluid-based dispersing gain element.

In FIG. 4c a gain element rod configuration 40 is shown, whose operation would be substantially identical to dispersive Brewster angle prism 11. In the case of FIG. 4c gain element 40 can be constructed by first fabricating Brewster angle prism 11 such as shown in FIG. 4a and, with a proper cutting or coring apparatus, coring out a cylindrical section 40 as shown in phantom in FIG. 4a. The geometry of gain element 40 in FIG. 4c is a commonly used geometry for Brewster angle laser rods for Ti:sapphire tunable solid state lasers with one important difference. The important difference is that, unlike traditional Brewster angle laser rods where end faces are parallel with respect to each other to minimize the effects of dispersion, this inventive concept has faces 40a and 40b which lie in intersecting planes. This orientation is more clearly perceived from the cored section 40 shown in FIG. 4a. The orientation of the Brewster ends of the gain element is an important aspect of this inventive concept. If the Brewster faces are parallel, the wavelength dispersion that is created within the gain element is reduced to a small parallel displacement of the wavelengths which emerge from the gain element. Although displaced, all wavelength beam paths are parallel and there is consequently no angular dispersion that results from a gain element with parallel faces.

Referring once again to FIG. 2, the tuning of laser 10 by rotating laser gain element 11 is not a desirable tuning expedient for several reasons. For one, laser gain element 10 is oriented for minimum deviation with respect to the resonator mode, as described above, so that a rotation of laser gain element 11 about an axis normal to the plane of the prism would place the prism in an orientation which is no longer the one that assures minimum deviation. An orientation for the prism other than minimum deviation would introduce additional astigmatism. A second problem with rotating laser gain element 11 about the axis normal to the plane of FIG. 2 is that laser pump beam 18' would deviate in its path through laser gain element 11 and require subsequent re-alignment of concave fold mirror 13 and highly reflective end element 17 whenever the wavelength was changed. A more practical means of tuning the wavelength is achieved by rotating highly reflective end element 17.

Figure 5:
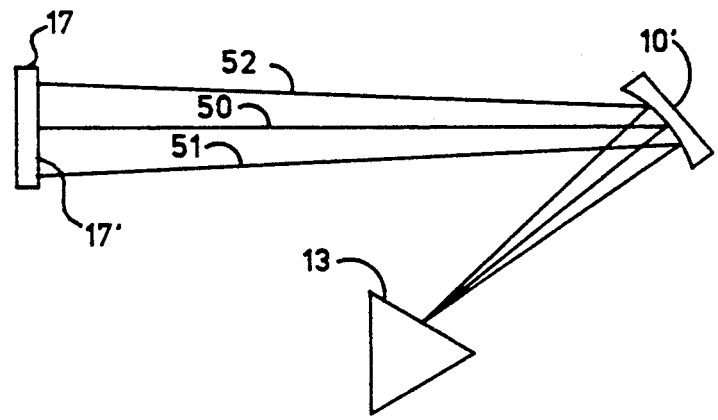
FIG. 5 illustrates the wavelength dispersion caused by a prism-shaped gain element.

Noting FIG. 5 that depicts a portion of tunable laser 10, the dispersive nature of laser gain element 11 directs a large band of wavelengths to highly reflective mirror 17. The wavelengths are each at slightly different angular orientations, see wavelength paths 50, 51, and 52 which represent paths for different wavelengths. As shown in this figure, only wavelength path 50 is normally incident on highly reflective end element 17, and therefore only this wavelength is fed back into the resonator to produce stimulated emission. However, by suitable rotation of highly reflective end element 17 about the axis normal to the plane of FIG. 5, it is clear that such rotation could orient the reflective face 17' of highly reflective end element 17 normal to wavelength path 51 or 52, thereby providing feedback and stimulated emission at a wavelength corresponding to feedback path 51 or 52, respectively. Therefore, tuning by rotation of highly reflective end element 17 can be accomplished without rotating laser gain element 11 and subsequent re-alignment of other optical elements within laser 10.

Figure 6:
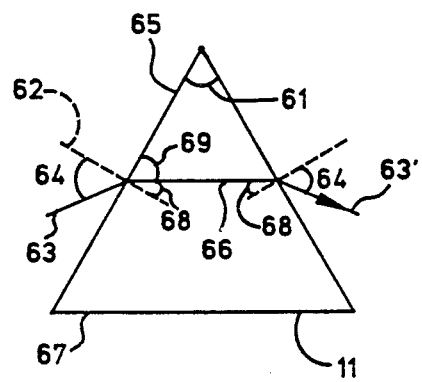
FIG. 6 is a detailed depiction of angles of note for a ray traversing a Brewster angle prism at minimum deviation.

Referring now to FIG. 6, laser gain element 11 is shown as a Brewster angle prism. The apex angle 61 of the Brewster prism is chosen so that for one particular wavelength and linear polarization, rays both enter the prism at 63 and exit the prism at 63' at the Brewster angle 64 when the prism is oriented for minimum deviation. For light within the prism linearly polarized with the electric field vector parallel to the plane of incidence, the entrance and exit faces are almost perfectly transmitting. Such a prism is useful inside a laser cavity operating on a low gain laser transition when even slight reflection losses produce a substantial decrease in laser performance.

Typically, the doping density of $Ti^{3+}$ in sapphire is very low, on the order of 0.1 to 0.15 percent. Therefore the $Ti^{3+}$ impurity does not greatly affect the refractive index of the sapphire material in regions where there is no absorption as discussed material in regions where there is no absorption as discussed above. At 786 nm the refractive index of sapphire is 1.7606. Brewster's angle for this wavelength is given by arctan of the refractive index, or 60.4°. Therefore, the angle of incidence 64 of ray 63 with respect to 62, which is the normal to prism face 65 of Brewster angle prism 11 must be 60.420 . For minimum deviation, optical path 66 of the laser resonator mode 15= of FIG. 2 within prism 11 must be symmetric with respect to the angles of incidence and refraction at both prism faces. In this context, the term symmetric means that the angles of incidence and refraction at one face are identical to the angles of incidence and refraction at the other face, respectively. For minimum deviation, the angle of refraction 68 is one half of the apex angle 61. From the well-known Snell's law, the angle of incidence i is related to the angle of refraction r through the refractive index n of the prism, $$n = \frac{\sin i}{\sin r} \quad (5)$$

where i is labelled 64 in FIG. 6 and r is 68. Therefore, angle 68 is 29.6°, and apex angle 61 in minimum deviation is then 59.19°. Note that angle 69 is Brewster's angle, 60.4° in this exemplary case and the prism is almost equilateral.

There are several important considerations to be taken into account when using the gain element as described herein as the dispersive element in the tunable laser. For an end pumped laser gain element as illustrated in FIG. 3, the pump efficiency (by which is meant the conversion of pump light to upper state laser population) is dependent on the optical path through laser gain element 11. In a typical Brewster cut laser gain element, where the Brewster faces are parallel to one another, the position of the focused pump beam as it traverses a laser gain element does not affect the path length. This is not true in the type of Brewster cut laser gain element that is required for this inventive concept. Noting FIG. 4c, the position and orientation of the focused pumping mode beam 18' in the x direction will affect the optical path of the laser pump beam within laser gain element 40. This in turn will affect the amount of pump light that is absorbed for a fixed titanium 3+ doping density and therefore affect the pump efficiency. In designing laser gain element 11 an appropriate length must be selected so that pumping through the center axial region of the laser gain element, which is most efficient from a diffraction point of view, will give the appropriate path length for absorption based on the doping density of the laser gain element. Typically, an exemplary path length is 2 cm; therefore, one would choose a rod such that the central length along the z axis, shown in FIG. 4c, is 2 cm centered in the vertical or x direction of FIG. 4c.

In addition, the resonator stability is affected by the optical path length through the gain element. As the gain element is translated in the x direction, the location of the focal points of mirrors 13 and 13' move along the z axial direction. Finally, the length of the gain element along the optical axis (z axis) affects the amount of correction for the astigmatism introduced by the off-axis use of fold mirrors 13 and 13'. It can therefore be seen that the specific orientation of the two Brewster faces of gain element 11, in which the planes containing the Brewster faces are mutually intersecting planes, requires additional considerations in designing the gain element length and in aligning the optical axis along the x direction in the gain element.

A second important criterion involves the compromises that must be made between efficient pumping of laser gain element 11 and efficient aberration-free dispersion by laser gain element 11. Looking to FIG. 3, in order to achieve good end pumping efficiency, a small pump waist 11p and a subsequently small matching resonator waist 11w are desired. The small pump waist provides high pump power density within the laser gain element. Matching the laser resonator waist size and position to the pump waist creates a gain aperture which naturally selects the TEM$_{00}$ laser resonator mode. This mode is the most desirable for efficient operation as well as good beam quality from an emerging laser beam 15" of laser 10 in FIG. 2. TEM$_{00}$ operation provides not only the highest power density for the emerging laser beam, which is important for many applications including nonlinear optical conversion or laser machining, but also provides the lowest amount of divergence for the laser beam, which is important for propagation issues. However, the tight focus required by small pump waist 11p and the consequent small resonator waist 11w contributes to aberrations of the resonator mode.

Prisms introduce a type of image defect called astigmatism. When astigmatism is present a point image is not formed of a point source but rather two image lines are located different distances from the imaging lens. The two lines are perpendicular to each other and to the central ray axis. If an object consists of vertical and horizontal lines, the vertical lines as a result of astigmatism appear to be imaged in the surface of one of the image lines while the horizontal lines are imaged in the surface of the other image line. Optical theory shows that in the case of a prism, astigmatism can be minimized if the prism is traversed by parallel light, and if the rays pass at minimum deviation. The condition of minimum deviation has been described previously. These conditions cannot be perfectly realized in any event, particularly when the light occurs over a wide wavelength range, as is the case in the exemplary Ti:sapphire laser and when the resonator mode comes to a focus in laser gain element 11, as is illustrated in FIG. 3.

However, it is desirable to approximate these conditions and this can be accomplished by noting that over the desired wide wavelength operating range the refractive index and Brewster's angle are only a slowly varying function of the wavelength. This is particularly true for the wavelength range of 700 to 850 nm where the principal dispersion tends to be lower than in the visible or ultraviolet spectral regions for most materials. Therefore, maintaining an approximately minimum deviation orientation over a relatively wide wavelength range can be accomplished.

To minimize the effects of focusing in optical gain element 11, it is important to take advantage of the Rayleigh range of focused Gaussian beam. The Rayleigh range, $z_r$, is given by $$z_R = \frac{\pi w_0^2}{\lambda} \tag{6}$$

where $w_0$ is the beam waist radius and is one half of the dimension of waist 11w shown in FIG. 3. Laser resonator beams are Gaussian beams and obey certain properties in terms of their propagation and intensity distribution. For a more complete description of Gaussian beams, see A. E. Siegman, *Lasers*, University Science Books, Mill Valley, 1986, pp. 667-670. Laser resonator mode 15' of FIG. 2 is a Gaussian beam and as previously mentioned, due to gain aperturing it is TEM$_{00}$. Aberrations will be minimized, particularly astigmatism, in laser resonator mode 15' by collimating it to the greatest extend possible in laser gain element 11.

The two concave fold mirrors 13 and 13' in FIG. 2 create a confocal region for the resonator mode between these two reflective elements; that is, laser resonator mode 15' is collimated between concave fold mirror 13' and adjacent end reflective element 17, and collimated as well between concave fold mirror 13 and adjacent output coupler 19. Between concave fold mirrors 13 and 13' the laser resonator mode is confocal, see FIG. 7, which shows a section of the tunable laser 10. Note again that in this figure, as is true of FIGS. 2, 3, 4 and 9, refraction of the laser resonator mode and pumping mode at both faces of gain element 11 has not been accurately depicted to avoid unnecessary complications of the drawings. Refraction of an optical beam at the prism faces is accurately illustrated in detail in FIGS. 1 and 6.

Figure 7:
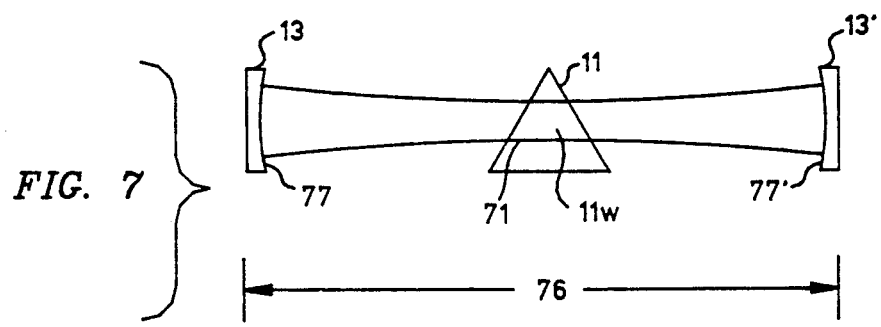
FIG. 7 illustrates the size variation of the resonator mode in the region between the two curved fold mirrors.

The two concave fold mirrors 13 and 13' are provided with broadband high reflective coatings over the range of 700 to 850 nm while being simultaneously highly transmissive to the argon ion pump laser wavelengths, including the 488 nm and 514 nm laser line in this exemplary case. In FIG. 7 only the section of the resonator mode between concave fold mirrors 13 and 13' is illustrated. Note also that laser gain element 11 is illustrated as a dispersing Brewster angle prism configuration, although it is clear that any of the embodiments shown in FIG. 4a, 4b or 4c will function identically. For a truly confocal arrangement, the radii of curvature of mirrors 13 and 13', 77 and 77', respectively, are equal to the separation 76 between these two mirrors. Confocal resonators can also be formed with two concave mirrors which have unequal radii of curvature. However, when the radii of curvature of the two mirrors are identical, a symmetric confocal resonator is created as is true in the exemplary case illustrated in FIG. 7. The size of laser resonator waist 11w, which is the diameter of the mode, is given by:

$$w_0 = \left(\frac{L\lambda}{2\pi}\right)^{\frac{1}{2}} \quad (7)$$

where L is the separation 76 between the two mirrors, $\lambda$ is the laser wavelength and $w_o$ is the beam diameter.

Figure 8:
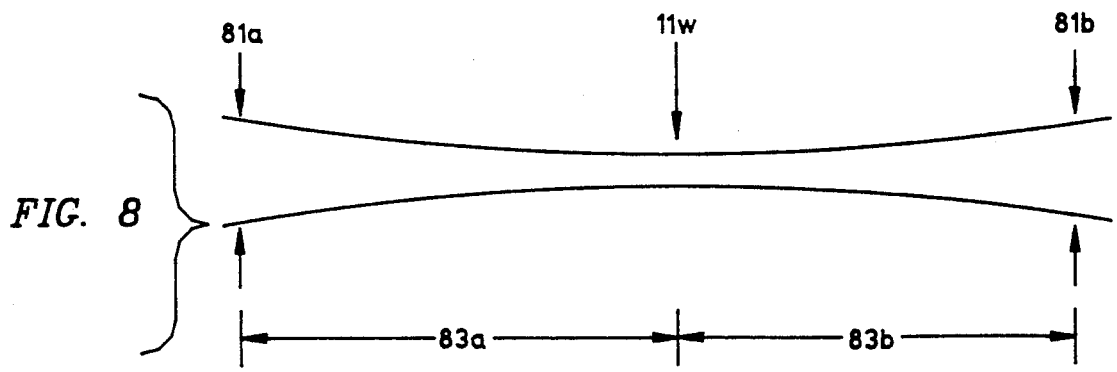
FIG. 8 illustrates the resonator mode size variation for a confocal resonator.

In FIG. 8 a detail of the confocal laser resonator mode near the waist position is shown. It can be noted that the resonator mode does not come to a sharp focus but comes to a gradual focus and is approximately collimated over the central focused region. Locations 81a and 81b in FIG. 8 correspond to the position where the resonator mode beam area is twice the minimum beam area where the waist 11w is located. The distances 83a and 83b between the waist location and position 81a or 81b, respectively, is identical for a symmetric confocal resonator. Each distance, 83a or 83b, corresponds to the Rayleigh range and the sum of distances 83a and 83b is called the confocal parameter. This parameter then corresponds to the range over which the laser resonator mode is less than or equal to twice the area of the resonator mode at waist 11w. Another way of saying this is that the beam diameter at position 81a or 81b is approximately 1.414 times the beam diameter at the location of waist position 11w. Therefore, the confocal parameter describes the region over which the laser resonator mode is approximately collimated.

For a confocal resonator the confocal parameter corresponds to the separation between the two mirrors, that is, the distance indicated as 76 in FIG. 7 is identical to the confocal parameter in this exemplary case. It can be further noted that the larger the radius of curvature of mirrors 13 and 13' relative to the length of the optical path 71 in laser gain element 11, the more collimated will be the resonator mode in the prism. However, as shown in equation (7), a larger separation L between the two concave fold mirrors will also lead to a larger beam waist, and this will increase the laser resonator threshold. Therefore, and appropriately designed laser 10 with Brewster dispersing gain element 11 located between concave fold mirrors 13 and 13' will for a given pump power density and given Ti$^{3+}$ doping density, strive to optimize pump efficiency, minimize the pump threshold power, maximize the pump slope efficiency, while simultaneously minimizing the aberrations introduced by dispersing Brewster angle gain element 11 due to the focusing of laser resonator mode 15' within laser gain element 11. This is identical to the trade-off between the radii of curvature and separation between the concave fold mirrors 13 and 13', the doping density of laser gain element 11 and the pump power from argon ion laser 12 as illustrated in FIG. 2.

Note that in this exemplary case, the optical path in gain element 11 is 2 cm, and the laser uses 10 cm radius of curvature mirrors 13 and 13' separated by approximately 10 cm. The optical path in the prism corresponds to only 20 percent of the confocal parameter. For all practical purposes, then, the beam is almost perfectly collimated within laser gain element 11 in this exemplary instance.

As noted earlier, the principal dispersion of the sapphire crystal is suitably high. This allows good wavelength separation using a single prism dispersing gain element 11 in laser resonator 11. To obtain some indication of the angular dispersion due to gain element prism 11 in laser resonator 10 the dispersion over a specific wavelength range must be known.

Referring back to equation (1), $$\frac{d\theta}{dn}$$

can be calculated since $\alpha$, the apex angle for the exemplary sapphire Brewster angle prism, is 59.19° for 786 nm. dn/d$\lambda$ between 786 nm and 820 nm is $2.65 \times 10^{-5}$ per nm. Therefore, d$\theta$/d$\lambda$ is $3.47 \times 10^{-5}$ radians/nm. For a resolution of 1 nm, then, end mirror 17 must be rotated by $3.47 \times 10^{-5}$ radians or approximately 7.2 arc seconds.

Figure 9:
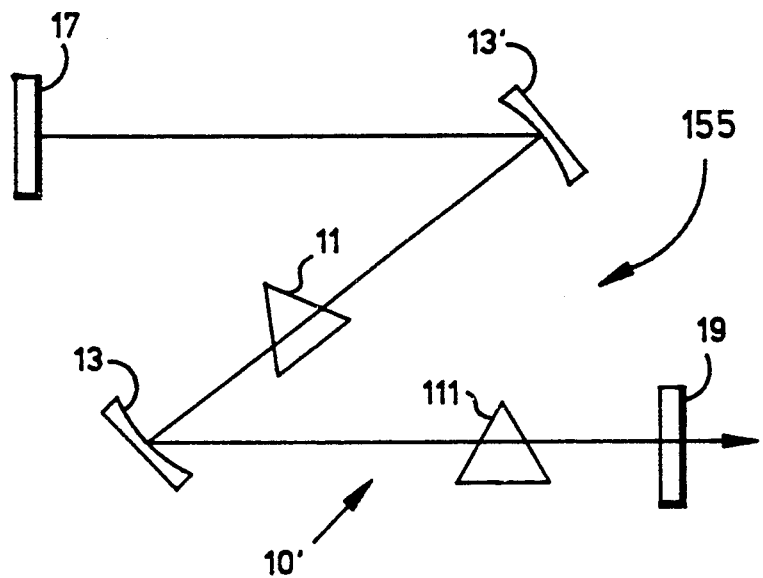
FIG. 9 illustrates a second embodiment of this inventive concept.

Additional prisms may be used as shown in the embodiment of tunable laser 10' illustrated in FIG. 9. The advantage of using an additional gain element prism 111 or prisms is that the dispersion is increased, that is, d$\theta$/d$\lambda$ is increased as the number of prisms is increased. For m identical prisms equation (2) becomes $$\frac{d\theta}{d\lambda} = m\frac{d\theta_0}{d\lambda_0} \text{ where } \frac{d\theta_0}{d\lambda_0}$$

is a dispersion of an individual prism.

In the embodiment of FIG. 9 the effects of refraction are ignored for simplicity. Note that the location of additional prism 111 in laser resonator 155 is in a region where the resonator mode is collimated to introduce the least amount of astigmatism. In addition, the orientation of additional prism 111 is that of minimum deviation. Additional prism 111 does not need to be composed of the same material as gain element 11. Thus, a more highly dispersive optical material can be selected for prism 111, increasing dispersion even beyond that which would be obtained if the material used to fabricate prism 111 were identical to the material used to fabricate gain element 11. However, the selection of the material to fabricate laser prism 111 must be in accordance with the specifications indicated above. These include low insertion loss at the laser output wavelength, high optical quality and resistance to optical damage.

Figure 10:
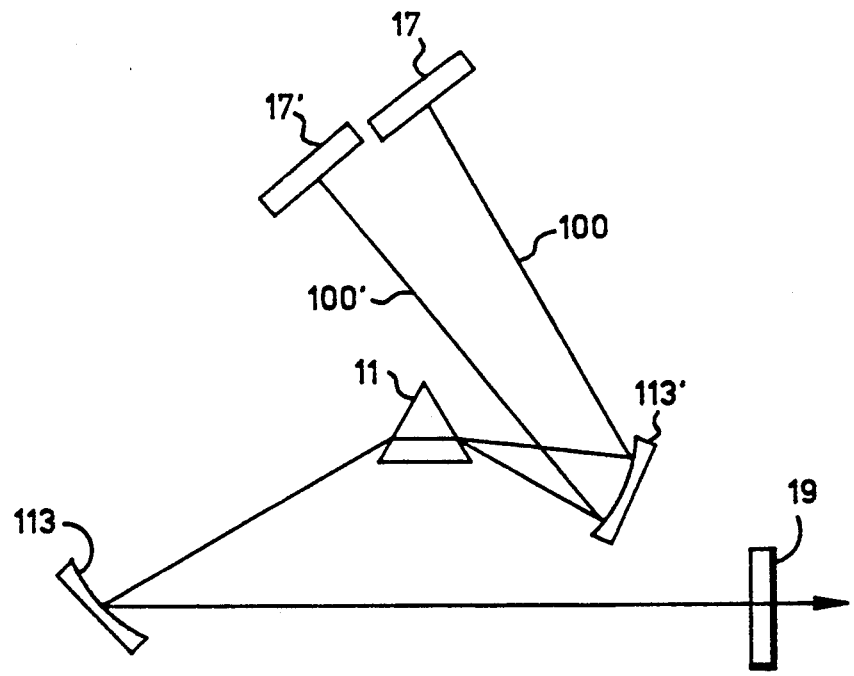
FIG. 10 illustrates a third embodiment of this inventive concept.

FIG. 10 illustrates yet another embodiment of this inventive concept where the Brewster angle dispersing gain element 11 is utilized in a multifrequency tunable laser. In this embodiment, dispersive gain element 11 is accompanied by two high end reflectors 17 and 17' which feed back simultaneously at different wavelengths along feedback paths 100 and 100', respectively. Thus, two uniquely different wavelengths are simultaneously caused to be emitted through output coupler 19 due to dispersion of prism gain element 11. Tuning of the wavelengths comprising individual wavelength feedback paths 100 and 100' is effected by angular rotation of highly reflective end elements 17 and 17', respectively. The details of the operation of a simultaneous multifrequency laser are elaborated in the above identified pending patent application.

Referring back now to FIG. 2, line narrowing, by which is meant narrowing of the bandwidth of the emitted laser light, can be effected by the insertion of an intracavity etalon or etalons in laser resonator 15. An exemplary pair of etalon plates, 27, can be inserted in a collimated region of resonator mode 15'. The coatings of the laser etalon plates are highly reflective at the laser wavelength for which narrowing is desired. The value of the reflectivity of these coatings for an etalon or etalons 27 inserted in resonator 15 determines the finesse of the etalons and therefore the ultimate bandwidth emitted by the laser. An exemplary pair of etalon plates 27, one 0.5 mm thick and another 10 mm thick, were positioned as indicated in laser 10. The resulting laser linewidth for a Ti:sapphire laser was narrowed by over a factor of 100, to 450 MHz. Angular tuning of the etalons may be required to reduce losses in the laser resonator cavity at the desired peak wavelength. The peak wavelength is determined by the position of Brewster angle dispersive laser gain element 11 and the angular orientation of the etalons and the angular orientation of highly reflective end element 17. Other combinations of etalon thicknesses, finesse and/or number of etalons may be selected as desired to change the bandwidth of the resulting laser emission. In this manner even narrower bandwidths may be achieved.

For the multi-frequency laser shown in FIG. 10, the selection of the number and thicknesses of the etalons is particularly important when they are placed in the region where both wavelengths are collinear, namely the region between fold mirror 113 and output coupler end element 19, for example, in the embodiment of FIG. 10. An alternative location for the etalons can be in the second collimated region of the laser resonator mode, that is, the region between concave fold mirror 113' and highly reflective end element 17 or 17'.

Laser gain element 11 in all the embodiments can have an exemplary laser host material which is selected from a broad group of crystalline or amorphous materials. Suitable materials include YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YALO (yttrium aluminum oxygen), GGG (gadolinium gallium garnet), YGG (yttrium gallium garnet), and LLGG (lanthanum lutetium gallium garnet). Laser gain element 11 can also be doped with different impurities, including $Cr^{3+}$. Various hosts for the $Cr^{3+}$ ion are known and include alexandrite, LiCAF (lithium calcium aluminum fluoride), LiSAF (lithium strontium aluminum fluoride), and LiSGAF (lithium strontium gallium flourode. Also, the crystal host material could be made up of mixtures or combinations of crystalline materials. In addition, amorphous materials such as glasses may be used. A wide variety of glasses are available including phosphate glasses, flint glasses, porous silicate glasses and many multitudinous proprietary glasses from such companies as Schott and Kigre. The chief characteristic or requirement of the selected host material is that it must have the capability of easily accepting the dopant ion and should have a reasonably high dispersion. In addition, certain requirements of all laser materials, including resistance to optical damage, homogeneity, low insertion loss, low passive loss, and low excited state absorption, must be satisfied. The dopant $Cr^{3+}$ ions or $Ti^{3+}$ ions must go into the host material without significantly perturbing the host structure so that the quality of the host material remains high.

When the dispersion of the laser gain element is high relative to the gain bandwidth of the gain element, it is possible that part of the wavelength band dispersed by Brewster angle laser gain element 11 will be beyond the aperture created by highly end reflective element 17. The linear dispersion at reflective element 17 can be determined when the typical separation between laser prism 11 and highly reflective end element 17 is 30 cm in this exemplary case is considered. Using the relationship $S = \theta r$ where S is the dimension transverse to the laser resonator mode 15' at highly reflective end element 17, $\theta$ is the angular dispersion for one nm and r is 30 cm, the spatial separation for one nm at highly reflective end element 17 is $10.4\mu$. This spatial separation corresponds to approximately one mm separation for 100 nm, which is well within the range of capability for an exemplary one-inch diameter HR reflective mirror 17. However, with a more highly dispersive intracavity prism the one-inch aperture of highly reflective end element 17 in this exemplary case may be exceeded, in which case tuning would have to proceed by rotation of Brewster angle laser gain element 11 followed by subsequent realignment of concave fold mirror 13' and highly reflective end element 17.

For the exemplary case the reflective elements are highly reflective from 700 to 850 nm. However, selecting reflectivities for mirrors 17, 13, 13' and 19 in the embodiment such as shown in FIG. 2 such that reflectivity is enhanced or degraded at other specific wavelengths, will allow operation over other wavelength ranges consistent with the gain characteristics of the laser gain element 11. Output coupler mirror 19 has a reflectivity that is approximately 95 percent at 780 nm and is gradually increased to 99.9 percent at both 700 nm and 850 nm. This gradual increase in reflectivity is desirable and necessary to compensate for the lower stimulated emission cross-section as the wavelength increases or decreases, respectively, from 780 nm. Thus, the mirror reflectivity for output coupler 19 is tailored to compensate for variations in the gain as a function of wavelength. In a similar manner, any wavelength range over which laser gain element 11 can produce optical gain can be produced by tailoring the spectral reflectivity of the optical elements including output coupleer 19. In the exemplary case of Ti:sapphire, the tuning range is 680 nm to $1.1\mu$ and the reflectivity of flat output coupler 19, fold mirrors 13 and 13', and flat HR end reflective element 17 in FIG. 2 can be tailored, for example, to achieve operation over any wavelength band within this wavelength range. Normally, the spectral reflectivity of the reflective elements of other embodiments of this inventive concept can be chosen to provide operation at any wavelength range for which there is net gain.

The concept of using a highly dispersive Brewster angle prism as a gain element is not restricted to solid state crystalline, amorphous, or glass-like materials. A hollow optical cell can be constructed with the exterior shape of any of the Brewster angle prisms illustrated in FIG. 4a, 4b or 4c or similar configurations where the Brewster angle is determined by the cell material, but the interior of the cell, for example the interior of prism 11 in FIG. 4a is hollow and filled with a liquid or gas gain medium, having sufficient dispersion to provide tuning over a wavelength range compatible with spectral dependence of the stimulated emission coefficient of the gain medium. As indicated previously, many solvents for dyes and chelates, such as water, have sufficient dispersion to be useful over certain wavelength ranges, particularly for water in the ultraviolet.

Optionally, pump laser 12 of FIG. 2 can be laser diodes, aluminum gallium arsenide or indium gallium arsenide or aluminum gallium indium phosphide, or can be other cw laser sources such as the second harmonic of a Nd:YAG laser or dye laser, for example, or any other laser source the output of which is absorbed by laser gain element 11 or, in the case where laser gain element 11 is a hollow prism-shaped or prism-like cell, by the active gain medium contents.

The gain medium material used to construct the hollow cell must be transparent to the pump wavelength as well as the laser emission wavelength. Laser gain element 11 can be any practicable length. In the exemplary case it is approximately 2 cm long. The length is selected to provide adequate gain at the desired operating wavelength and adequate absorption at the pump laser fluence and wavelength.

In addition to adjusting the length, the concentration of the dopant material may be adjusted within certain bounds determined by the ability to maintain homogeneity as well as to provide highly efficient laser operation without regard to de-excitation processes caused, in some cases, by too high dopant densities. Such processes are typically known as quenching or, more specifically, concentration quenching. In the preferred embodiment of the Ti:sapphire laser the doping density ranges from 0.03 percent by weight to 0.15 percent by weight. Densities as high as 0.25 percent of $Ti^{3+}$ by weight may be used and for other dopant and host combinations the dopant density generally will be adjusted such that the absorption of the pump radiation by the gain element, which is determined by the optical path of the pump beam through the gain element, is sufficiently high. This absorption is usually in the range of 80 to 100 percent, while the gain minus the passive losses in the gain element is adequate to provide operation over a predetermined range of wavelengths. For $Cr^{3+}$, the dopant density is generally between 0.03 percent and 100 percent by weight.

In addition, non-laser sources such as arc lamps or cw filament lamps or flash lamps or other gas-filled lamps can be used to excite the laser gain element. For pulsed excitation the output of the laser fabricated in accordance with this inventive concept will be pulsed. Operation using cw excitation will be either cw or pulsed depending upon whether elements for interrupting cw operation are inserted into the laser resonator cavity.

For extended sources and incoherent sources, such as lamps, it may prove to be beneficial from both an efficiency and a pragmatic point of view to optically excite laser gain element 11 by pumping through the side. Side pumping is accomplished for example by preparing the laser gain element as shown in FIG. 4b with a face 11b that is highly polished to allow good transmission of the pump fluence entering the laser gain medium from the side. With such side pumping, the $TEM_{00}$ gain aperture may be retained by suitable focusing such as with a cylindrical lens to create a cylindrical excitation volume very close to side pumping face 11b of FIG. 4b. Such excitation methods are well known in the art for side pumped dye lasers using a laser excitation source.

A laser in accordance with this inventive concept has a wide range of applications including various medical sensing, pollution monitoring, laser ranging, aircraft wind speed and wind shear measurement applications, surveillance and communications. It should therefore readily be understood that many modifications and variations of the present invention are possible within the purview of the claimed invention. It is therefore to be understood that within the scope of the appended claims the invention may be practiced otherwise than as specifically described.

I claim:

1. A tunable laser emitting within a preselected range of wavelengths to allow the tuning thereof comprising:
    a resonator of said preselected range of wavelengths including a rotatable highly reflective flat element, two highly reflective concave fold mirror elements and an output coupler flat reflective element arranged to form a laser cavity having a reflective path for a resonator mode therebetween, said rotatable highly reflective flat element being selectively rotatable to provide tuning among said preselected range of wavelengths;
    a laser gain element disposed in said laser cavity, said laser gain element being fabricated from a material having the properties to produce an optical emission of said resonator mode including said preselected range of wavelengths and to spatially disperse said preselected range of wavelengths therein, said laser gain element being provided with end faces each disposed at Brewster's angle with respect to said resonator mode and each of said end faces being oriented in a separate plane that mutually intersects to assure a spatial dispersion of said preselected range of wavelengths, said laser gain element being located between said two concave fold mirror elements; and
    means for optically exciting said laser gain element disposed with respect to said laser gain element in an end pumping mode to assure said optical emission of said resonator mode including said preselected range of wavelengths.

2. The laser of claim 1 in which said two highly reflective concave fold mirror elements have an identical radius of curvature and are spaced from one another a distance approximately equal to said radius of curvature to form a confocal region of said resonator mode therebetween and produce a collimated region of said laser resonator mode between each said concave fold mirror element and the adjacent reflective flat element.

3. The laser of claim 2 further including:
    means disposed in said laser cavity for narrowing the linewidth of said optical emission in said laser.

4. The laser of claim 3 in which said means disposed in said laser cavity for narrowing the linewidth includes two etalons of different thicknesses disposed in said laser cavity.

5. The laser of claim 1 in which said end faces of said laser gain element provides a polarized laser said resonator mode within said laser resonator cavity.

6. The laser of claim 1 in which said laser gain element includes a solid state host material doped with activator ions to produce a laser emission in said preselected range of wavelengths when said laser gain element is optically excited by said means for optically exciting.

7. The laser of claim 6 in which said solid state host material is a sapphire crystal host material and said activator ions in said sapphire crystal host material include a dopant of $Ti^{3+}$ ions to enable said laser gain element to produce a laser emission within said preselected range of wavelengths from about 680 nm to 1.1 microns when said laser gain element is optically excited by said means for optically exciting.

8. The laser of claim 6 in which said activator ions in said host material are $Cr^{3+}$ ions in an effective percent concentration between 0.03 percent and 100 percent by weight and said host material is selected from the group consisting of alexandrite, LiCAF, LiSAF and LiSAGAF and mixtures thereof.

9. The laser of claim 1 in which said means for optically exciting said laser gain element is a laser emitting a cw pump beam at at least one wavelength in the range of approximately 450 nm to 550 nm.

10. The laser of claim 9 in which said means for optically exciting said laser gain element is an argon ion laser.

11. The laser of claim 1 in which said means for optically exciting said laser gain element includes a means for generating a pulsed pumping beam and a means for optically focusing interposed between the pulsed pumping beam generating means and said laser gain element, said laser gain element being optically excited by said pulsed pumping beam to produce a pulsed said optical emission within said preselected range of wavelengths.

12. The laser of claim 11 in which said means for optically exciting said laser gain element is a laser diode.

13. The laser of claim 11 in which said means for optically exciting said laser gain element is a laser for emitting said pulsed pumping beam at at least one wavelength in the range of approximately 450 to 550 nm.

14. The laser of claim 11 in which said means for optically exciting said laser gain element is the second harmonic of a pulsed Nd:YAG laser.

15. The laser of claim 11 in which said laser gain element is side pumped by a flash lamp having a long dimension along a first axis which is substantially parallel to the long axis of said laser gain element for enabling said laser gain element to absorb light from said flash lamp along said long dimension of said laser gain element.

16. The laser of claim 1 in which said means for optically exciting is a means for pumping with a cw beam and a means for optically focusing disposed between said means for pumping and said laser gain element for matching the cw pump beam to said laser gain element, said laser gain element being excited by said cw beam to produce a cw emission in said preselected range of wavelengths.

17. The laser of claim 1 in which said laser gain element is an amorphous material doped with activator ions to produce a laser emission in said preselected range of wavelengths when said laser gain element is optically excited by end pumping thereof to produce said emitting.

18. The laser of claim 1 in which said laser gain element is a glass-like material doped with activator ions to produce a laser emission in said preselected range of wavelengths when said laser gain element is optically excited by end pumping thereof to produce said emitting.

19. The laser of claim 1 where said laser gain element consists of a hollow prism-shaped optical cell to contain a fluid gain medium and further including an entrance and exit window which is transparent to both the pump wavelength of said means for optically exciting said laser gain element and the wavelength of said optical emission, said entrance and exit window being oriented at Brewster's angle with respect to said resonator mode to define said end faces thereof and said entrance and exit window each being oriented in a separate plane that mutually intersects to assure said spatial dispersion.

20. The laser of claim 19 where said prism-like cell contains a fluid which is a solution of laser dye.

21. The laser of claim 19 where said prism-like cell contains a fluid which is a chelate solution.

22. The laser of claim 2 in which at least one additional dispersing prism is disposed in said laser cavity between one of said concave fold mirrors and said highly reflective flat element to further spatially disperse said preselected range of wavelengths and said at least one additional dispersing prism and said highly reflective flat element are aligned in a manner such that a discrete feedback path is established for a specific wavelength within said preselected range of wavelengths.

23. The laser of claim 1 further including at least one additional highly reflective flat element disposed in said laser cavity where said at least one additional highly reflective flat element is aligned in a manner such that it defines a discrete end portion of a separate one of at least two resonant paths in said laser cavity each for a discrete one of at least two wavelengths within said preselected range of wavelengths.

24. The laser of claim 1 in which said resonator mode between said concave fold mirror elements forms a confocal resonator mode which is approximately collimated where it is contained within said laser gain element.

* * * * *